(12) United States Patent
Shin

(10) Patent No.: US 8,854,740 B2
(45) Date of Patent: Oct. 7, 2014

(54) ZOOM LENS

(71) Applicants: Sintai Optical (Shenzhen) Co., Ltd., Shenzhen (CN); Asia Optical International Ltd., Road Town (GB)

(72) Inventor: Hui-Jen Shin, Taichung (TW)

(73) Assignees: Sintai Optical (Shenzhen) Co., Ltd., Guandong Province (CN); Asia Optical International Ltd., B.V.I (GB)

( * ) Notice: Subject to any disclaimer, the term of this patent is extended or adjusted under 35 U.S.C. 154(b) by 172 days.

(21) Appl. No.: 13/690,045

(22) Filed: Nov. 30, 2012

(65) Prior Publication Data
US 2013/0141796 A1    Jun. 6, 2013

(30) Foreign Application Priority Data
Dec. 2, 2011    (TW) .............................. 100144477 A

(51) Int. Cl.
*G02B 15/14*    (2006.01)
*G02B 15/173*    (2006.01)
(52) U.S. Cl.
CPC .............. *G02B 15/14* (2013.01); *G02B 15/173* (2013.01)

USPC .......................................................... 359/683
(58) Field of Classification Search
USPC ......................................... 359/683, 687, 714
See application file for complete search history.

(56) References Cited

U.S. PATENT DOCUMENTS

2012/0038795 A1*    2/2012    Katayose et al. ............. 359/683

* cited by examiner

*Primary Examiner* — Alicia M Harrington
(74) *Attorney, Agent, or Firm* — Ming Chow; Sinorica, LLC

(57) ABSTRACT

A zoom lens includes a first lens group, a second lens group, a third lens group, an aperture, a fourth lens group, and a fifth lens group in order along an optical axis from an object side to an image side. The first lens group has positive refractive power, and includes four lenses. The second lens group has negative refractive power, and includes three lenses. The third lens group has positive refractive power, and includes one lens. The fourth lens group has positive refractive power, and includes five lenses. The fifth lens group has positive refractive power, and includes one lens. The zoom lens is switched to the telephoto mode from the wide-angle mode by moving the second lens group and the fourth lens group toward the third lens group.

13 Claims, 12 Drawing Sheets

ZOOM LENS

BACKGROUND OF THE INVENTION

1. Field of the Invention

The present invention relates generally to a lens, and more particularly to a zoom lens.

2. Description of the Related Art

With advancement in technology, image devices, such as camera, video camera, microscope, and scanner, are made smaller and lighter for portability and operation that the zoom lenses incorporated in such image devices have to reduce its size. Except that, the zoom lenses must have high optical performance, such as high zoom ratio, high resolution, and high contrast. Therefore, small size and high optical performance are the important facts of the modern zoom lenses.

In order to raise the zoom ratio and the optical performance, more and more lens groups are provided in the zoom lens. As we know, some zoom lenses have six lens groups or more, and the totally lenses of the lens groups are more than twenty. It is obvious that more lens groups will cause the zoom lens bigger and heavier. However, when the zoom lens has fewer lens groups, it may have a small size, but the optical performance is poor.

Therefore, the conventional zoom lens still needs to be improved.

SUMMARY OF THE INVENTION

The primary objective of the present invention is to provide a zoom lens, which has a small size, high zoom ratio, and high optical performance.

According to the objective of the present invention, the present invention provides a zoom lens including a first lens group, a second lens group, a third lens group, an aperture, a fourth lens group, and a fifth lens group in order along an optical axis from an object side to an image side. The first lens group has positive refractive power, and includes a first lens, a second lens, a third lens, and a fourth lens, wherein the first lens is a meniscus lens with negative refractive power, and a convex surface thereof faces the object side; the second lens is a flat lens; the third lens is a biconvex lens with positive refractive power, and has at least an aspheric surface; and the fourth lens is a biconvex lens with positive refractive power. The second lens group has negative refractive power, and includes a fifth lens, a sixth lens, and a seventh lens, wherein the fifth lens is a biconcave lens with negative refractive power, and has at least an aspheric surfaces; the sixth lens is a biconvex lens with positive refractive power; the seventh lens is a meniscus lens with positive refractive power, and a convex surface thereof faces the object side; and the sixth lens and seventh lens are coupled together to form a compound lens with negative refractive power. The third lens group has positive refractive power, and includes an eighth lens, wherein the eighth lens could be a plastic meniscus lens with positive refractive power, and a convex surface thereof faces the object side; and the eighth lens has at least an aspheric surface. The fourth lens group has positive refractive power, and includes a ninth lens, a tenth lens, an eleventh lens, a twelfth lens, and a thirteenth lens, wherein the ninth lens is a biconvex lens with positive refractive power, and has an aspheric surface; the tenth lens is a meniscus lens with positive refractive power, and a convex surface thereof faces the object side; the eleventh lens is a meniscus lens with negative refractive power, and a convex surface thereof faces the object side; the tenth lens and eleventh lens are coupled together to form a compound lens with positive refractive power; the twelfth lens is a biconvex lens with positive refractive power; the thirteenth lens is a biconcave lens with negative refractive power; and the twelfth lens and the thirteenth lens are coupled together to form a compound lens with positive refractive power. The fifth lens group has positive refractive power, and includes a fourteenth lens, wherein the fourteenth lens could be a plastic biconvex lens with positive refractive power, and has at least an aspheric surface. The zoom lens is switched to a telephoto mode from a wide-angle mode by moving the second lens group and the fourth lens group toward the third lens group.

In an embodiment, both surfaces of the third lens of the first lens group are aspheric surfaces.

In an embodiment, both surfaces of the fifth lens of the second lens group are aspheric surfaces.

In an embodiment, a surface of the eighth lens of the third lens group which faces the object side is an aspheric surface.

In an embodiment, a surface of the ninth lens of the fourth lens group which faces the object side is an aspheric surface.

In an embodiment, both surfaces of the fourteenth lens of the fifth lens group are aspheric surfaces.

In an embodiment, the zoom lens further comprises a cover glass between the fifth lens group and the image side.

In an embodiment, the zoom lens satisfies a feature of $8 \leq L/Z \leq 9.5$, where L is a total length of the zoom lens and Z is a zoom ratio of the zoom lens.

In an embodiment, the zoom lens satisfies a feature of $3 \leq F1/D \leq 4$, where F1 is a focus length of the first lens group and D is a maximum imaging diameter of the zoom lens.

In an embodiment, the zoom lens satisfies a feature of $Vd1n \geq 40$, where $Vd1n$ is an average of Abbe numbers of the lenses with negative refractive power in the first lens group.

In an embodiment, the zoom lens satisfies a feature of $Vd1p \geq 75$, where $Vd1p$ is an average of Abbe numbers of the lenses with positive refractive power in the first lens group.

Therefore, the zoom lens of the present invention has both features of small size and high optical performance.

DETAILED DESCRIPTION OF THE INVENTION

Figure 1:
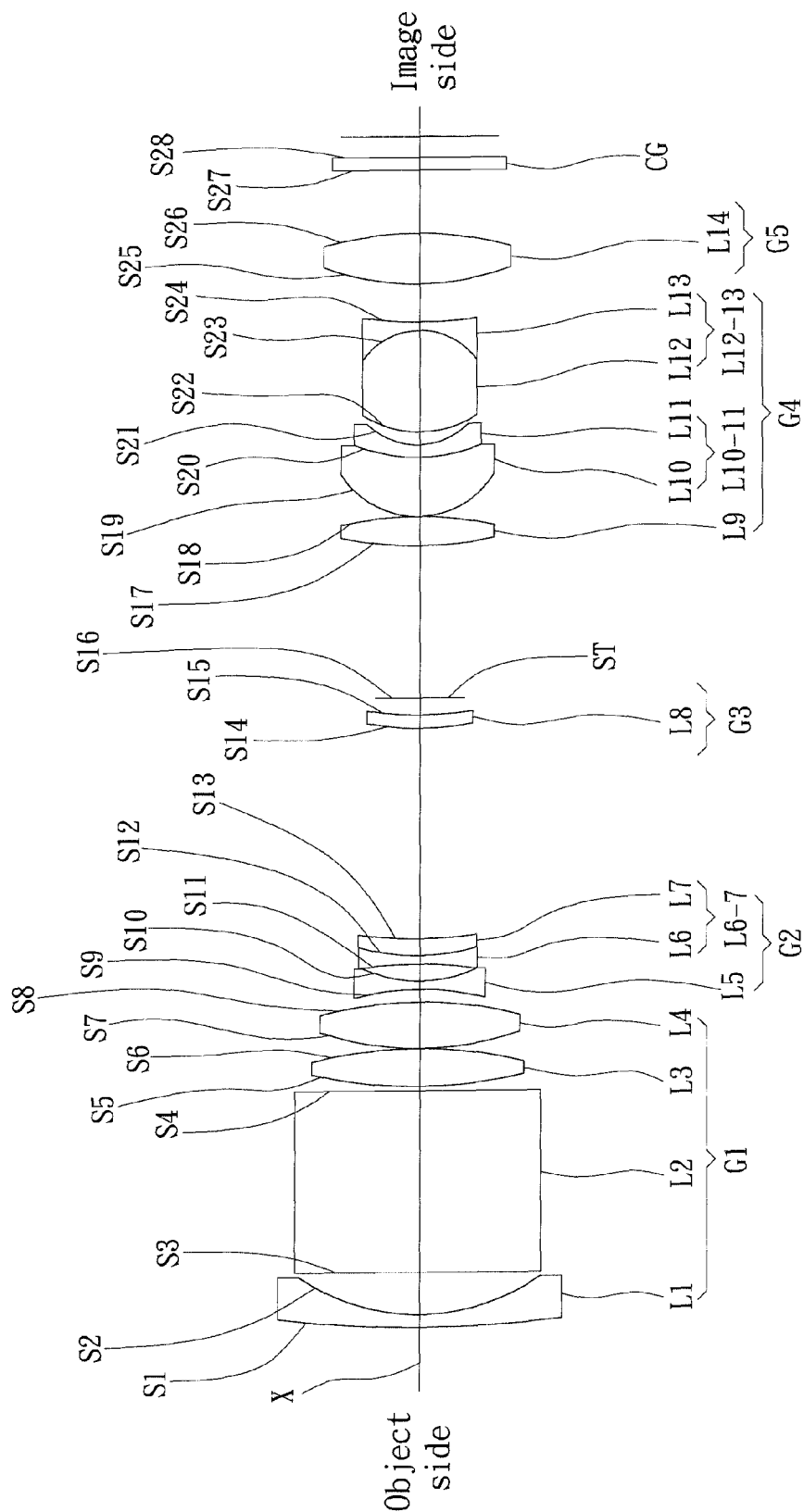
FIG. 1 is a sketch diagram of the arrangement of the lenses of a preferred embodiment of the present invention in the wide-angle mode.
Figure 2:
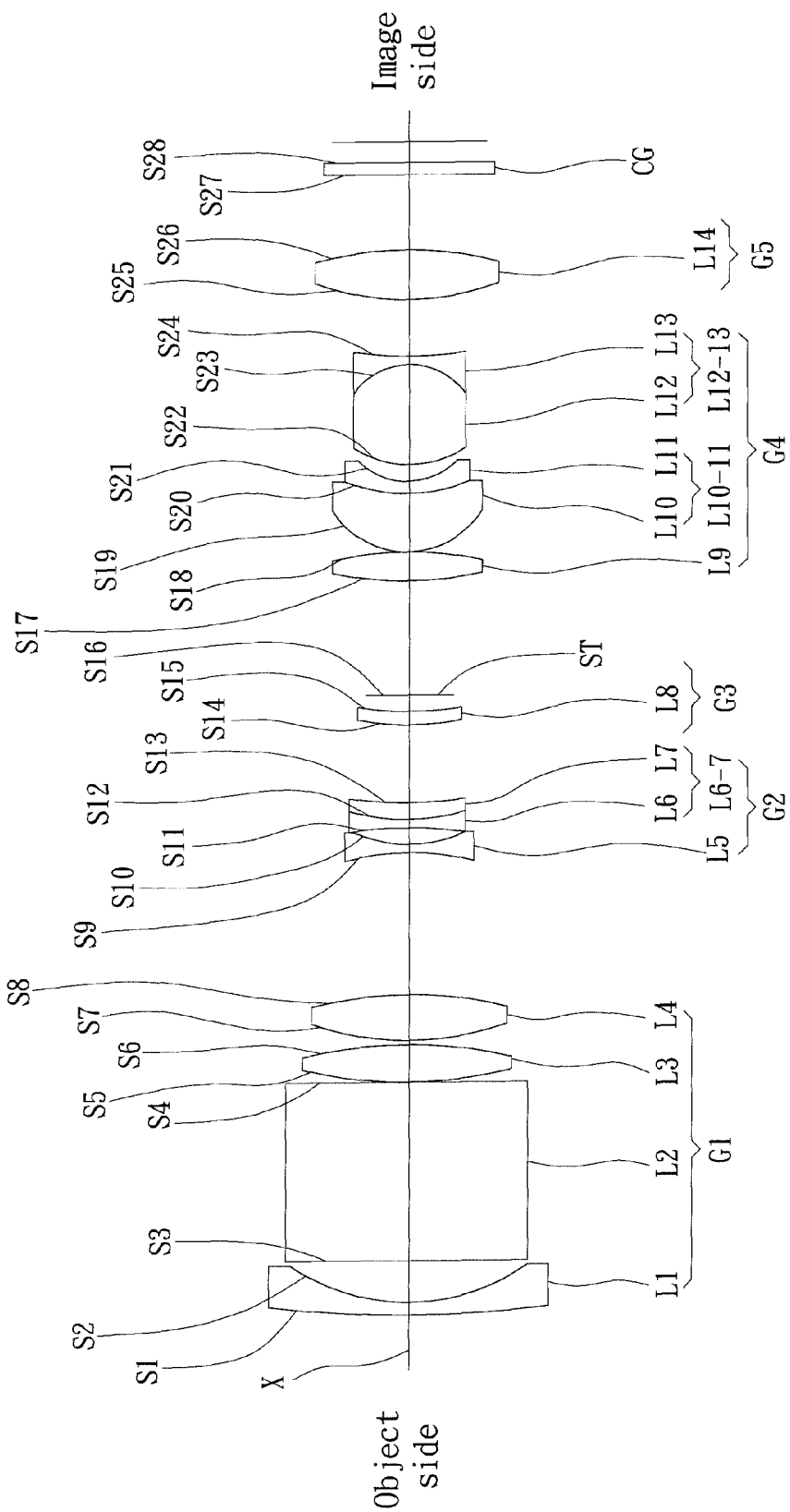
FIG. 2 is a sketch diagram of the arrangement of the lenses of the preferred embodiment of the present invention in the middle mode.
Figure 3:
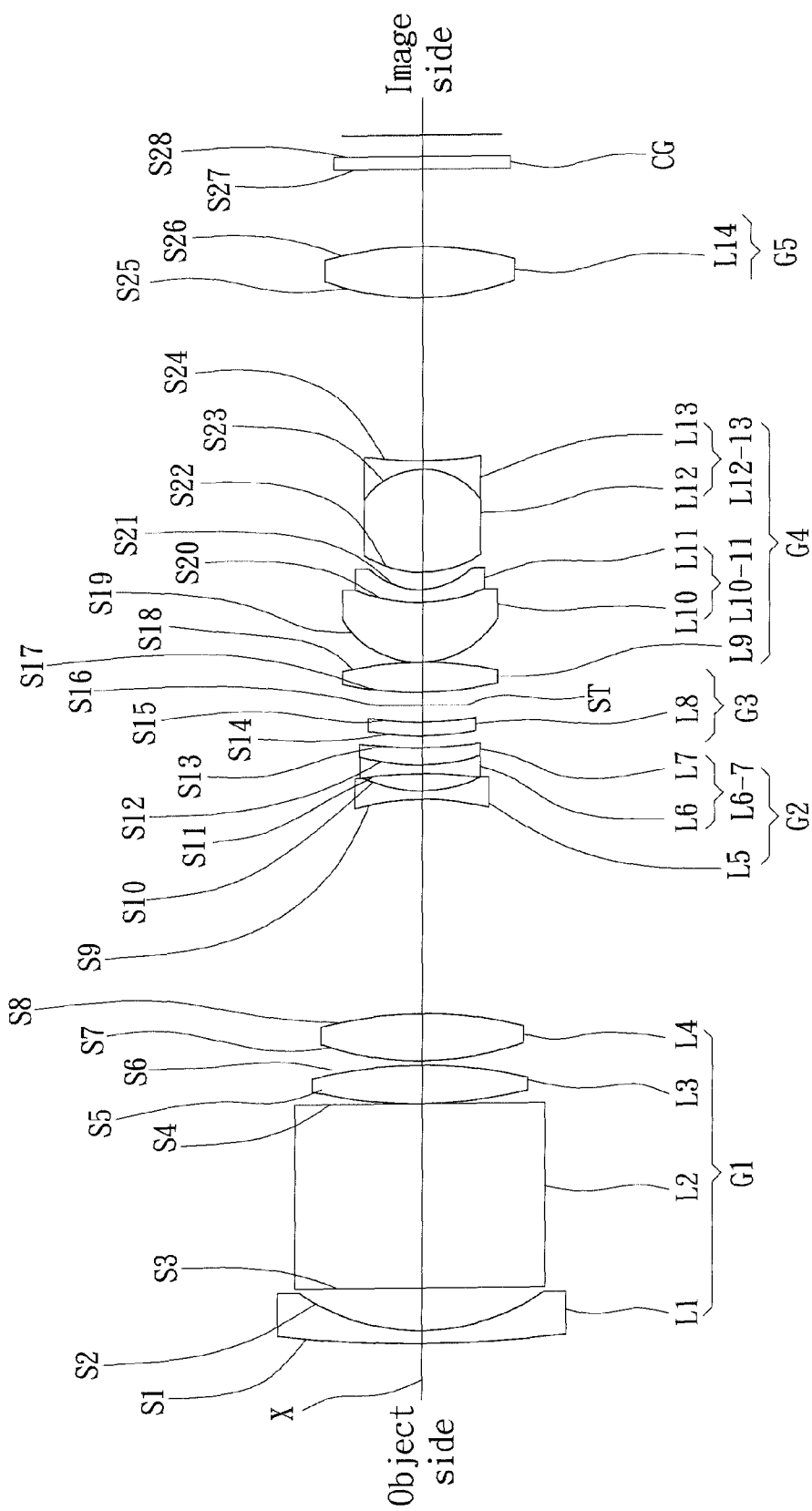
FIG. 3 is a sketch diagram of the arrangement of the lenses of the preferred embodiment of the present invention in the telephoto mode.

As shown in FIG. 1 to FIG. 3, a zoom lens of the preferred embodiment of the present includes a first lens group G1, a second lens group G2, a third lens group G3, an aperture ST, a fourth lens group G4, and a fifth lens group G5 in order along an optical axis X from an object side to an image side. With movements of the second lens group G2 and the fourth lens group G4, the zoom lens may be switched to a wide-angle mode (FIG. 1), a middle mode (FIG. 2), and a telephoto mode (FIG. 3). It may be further provided with a cover glass CG, which is a flat glass in the present embodiment, between the fifth lens group G5 and the image side.

The first lens group G1 has positive refractive power and includes a first lens L1, a second lens L2, a third lens L3, and a fourth lens L4. The first lens L1 is a meniscus lens with negative refractive power, and its convex surface S1 faces the object side. The second lens L2 is a flat lens to refract the light. The third lens L3 is a biconvex lens with positive refractive power, and both convex surfaces S5, S6 thereof are aspheric surfaces. The fourth lens L4 is a biconvex lens with positive refractive power.

The second lens group G2 has negative refractive power and includes a fifth lens L5, a sixth lens L6, and a seventh lens L7. The fifth lens L5 is a biconcave lens with negative refractive power, and both convex surfaces S9, S10 thereof are aspheric surfaces. The sixth lens L6 is a biconcave lens with negative refractive power. The seventh lens L7 is a meniscus lens with positive refractive power, and its convex surface S12 faces the object side. The sixth and the seventh lenses L6 and L7 are coupled together to form a compound lens L6-7 with negative refractive power.

The third lens group G3 has positive refractive power and includes an eighth lens L8. The eighth lens L8 could be a plastic meniscus lens with positive refractive power, and its convex surface S14 is an aspheric surface and faces the object side.

The fourth lens group G4 has positive refractive power, and includes a ninth lens L9, a tenth lens L10, an eleventh lens L11, a twelfth lens L12, and a thirteenth lens L13. The ninth lens L9 is a biconvex lens with positive refractive power, and its convex surface S17 is an aspheric surface and faces the object side. The tenth lens L10 is a meniscus lens with positive refractive power, and its convex surface S19 faces the object side. The eleventh lens L11 is a meniscus lens with negative refractive power, and its convex surface S20 faces the object side. The tenth and the eleventh lenses L10 and L11 are coupled together to form a compound lens L10-11 with positive refractive power. The twelfth lens L12 is a biconvex lens with positive refractive power, and the thirteenth lens L13 is a biconcave lens with negative refractive power. The twelfth lens L12 and the thirteenth lens L13 are coupled together to form a compound lens L12-13 with positive refractive power.

The fifth lens group G5 has positive refractive power and includes a fourteenth lens L14. The fourteenth lens L14 could be a plastic biconvex lens with positive refractive power, and both convex sides S25, S26 thereof are aspheric surfaces.

As shown in FIG. 1 and FIG. 2, the zoom lens is switched to the middle mode from the wide-angle mode by moving both the second lens group G2 and the fourth lens group G4 toward the third lens group G3. As shown in FIG. 2 and FIG. 3, the zoom lens is switched to the telephoto mode from the middle mode by moving both the second lens group G2 and the fourth lens group G4 toward the third lens group G3. As shown in FIG. 1 and FIG. 3, the zoom lens is switched to the telephoto mode from the wide-angle mode by moving both the second lens group G2 and the fourth lens group G4 toward the third lens group G3.

In order to obtain a good optical performance, the zoom lens 1 of the present invention has the following features:

$$8 \leq L/Z \leq 9.5; \tag{1}$$

$$3 \leq F1/D \leq 4; \tag{2}$$

$$Vd1n \geq 40; \tag{3}$$

$$Vd1p \geq 75 \tag{4}$$

where

L is a total length of the zoom lens;

Z is a zoom ratio of the zoom lens;

F1 is a focus length of the first lens group G1;

D is a maximum imaging diameter of the zoom lens;

Vd1$n$ is an average of Abbe numbers of the lenses with negative refractive power in the first lens group G1; and Vd1$p$ is an average of Abbe numbers of the lenses with positive refractive power in the first lens group G1.

In the present embodiment, L is 59.49, Z is 6.59, F1 is 13.960, D is 3.88, Vd1$n$ is 40.765, and Vd1$p$ is 88.245. However, any design which satisfies above features should be still in the scope of the present invention.

The focus length (F), the radius of curvature at the optical axis X of each lens (R), the interval between the neighboring lenses at the optical axis X (I), the refractive index (Nd) of each lens, and the Abbe number (Vd) of each lens are shown in Table 1.

TABLE 1

| F = 5.16(W)~13.59(M)~34.04(T) | | | | |
|---|---|---|---|---|
| | R (mm) | I (mm) | Nd | Vd |
| S1 | 75.812 | 0.600 | 1.882997 | 40.765107 L1 |
| S2 | 10.508 | 2.118 | | |
| S3 | INF | 8.557 | 1.846660 | 23.777940 L2 |
| S4 | INF | 0.120 | | |

TABLE 1-continued

F = 5.16(W)~13.59(M)~34.04(T)

|     | R (mm)  | I (mm)                    | Nd       | Vd        |     |
|-----|---------|---------------------------|----------|-----------|-----|
| S5  | 22.750  | 1.801                     | 1.496999 | 81.545888 | L3  |
| S6  | −22.750 | 0.130                     |          |           |     |
| S7  | 18.614  | 1.930                     | 1.438750 | 94.946025 | L4  |
| S8  | −15.964 | 0.500(W)~6.002(M)~10.661(T) |        |           |     |
| S9  | −13.151 | 0.500                     | 1.743198 | 49.295578 | L5  |
| S10 | 7.267   | 0.900                     |          |           |     |
| S11 | −50.651 | 0.400                     | 1.589130 | 61.135024 | L6  |
| S12 | 12.167  | 1.008                     | 1.922860 | 18.896912 | L7  |
| S13 | 61.782  | 10.661(W)~5.159(M)~0.500(T) |        |           |     |
| S14 | 8.274   | 0.823                     | 1.525279 | 55.950760 | L8  |
| S15 | 16.909  | 0.800                     |          |           |     |
| S16 |         | 8.094(W)~3.116(M)~0.800(T) |         |           | ST  |
| S17 | 19.956  | 2.259                     | 1.589130 | 61.152601 | L9  |
| S18 | −26.587 | 0.130                     |          |           |     |
| S19 | 4.864   | 3.079                     | 1.496999 | 81.545888 | L10 |
| S20 | 11.658  | 0.600                     | 2.000692 | 25.460000 | L11 |
| S21 | 4.554   | 0.424                     |          |           |     |
| S22 | 6.444   | 5.007                     | 1.575006 | 41.505207 | L12 |
| S23 | −3.138  | 0.450                     | 1.882997 | 40.765107 | L13 |
| S24 | 27.689  | 2.645(W)~3.058(M)~7.880(T) |         |           |     |
| S25 | 17.563  | 1.744                     | 1.534611 | 56.072148 | L14 |
| S26 | −17.563 | 2.494(W)~7.058(M)~4.553(T) |         |           |     |
| S27 | INF     | 0.720                     | 1.516330 | 64.142022 | CG  |
| S28 | INF     | 1.000                     |          |           |     |

In the column I of Table 1, W indicates the interval between two neighboring surfaces in the optical axis X in the wide-angle mode; M indicates the interval between two neighboring surfaces in the optical axis X in the middle mode; T indicates the interval between two neighboring surfaces in the optical axis X in the telephoto mode.

The depression z of the aspheric surfaces S5, S6, S9, S10, S14, S17, S25, and S26 may be obtained by the following equation:

$$z = \frac{ch^2}{1+\sqrt{1-(k+1)c^2h^2}} + Ah^4 + Bh^6 + Ch^8 + Dh^{10} + Eh^{12} + Fh^{14}$$

where z is the depression of the aspheric surface;
c is the reciprocal of radius of curvature;
h is the radius of aperture on the surface;
k is conic constant;
A-F are coefficients of the radius of aperture h.

The conic constants of the aspheric surfaces and the coefficients A~F are shown in Table 2.

TABLE 2

|     | k | A              | B              | C              |
|-----|---|----------------|----------------|----------------|
| S5  | 0 | −4.4561519E−05 | −1.4328127E−07 | 1.6792788E−09  |
| S6  | 0 | 4.4561519E−05  | 1.4328127E−07  | −1.6792788E−09 |
| S9  | 0 | 1.4614121E−03  | −4.6851619E−04 | 9.5711955E−05  |
| S10 | 0 | 8.9860853E−04  | −5.4895134E−04 | 1.2153680E−04  |
| S14 | 0 | −2.4555211E−04 | 7.0557464E−06  | −3.1160627E−06 |
| S17 | 0 | −9.9652529E−05 | 1.6735460E−06  | −1.6033829E−07 |
| S25 | 0 | 3.2036955E−05  | 5.3192335E−07  | 4.6869103E−08  |
| S26 | 0 | −3.2036955E−05 | −5.3192335E−07 | −4.6869103E−08 |

|     | D              | E             | F              |
|-----|----------------|---------------|----------------|
| S5  | −5.6374952E−11 | 0             | 0              |
| S6  | 5.6374952E−11  | 0             | 0              |
| S9  | −1.0071714E−05 | 5.3100725E−07 | −1.1103570E−08 |
| S10 | −1.3603495E−05 | 7.6075949E−07 | −1.6659320E−08 |
| S14 | 3.0809417E−07  | 0             | 0              |
| S17 | 5.5345926E−09  | 0             | 0              |
| S25 | −2.1666341E−09 | 0             | 0              |
| S26 | 2.1666341E−09  | 0             | 0              |

Figure 4A:
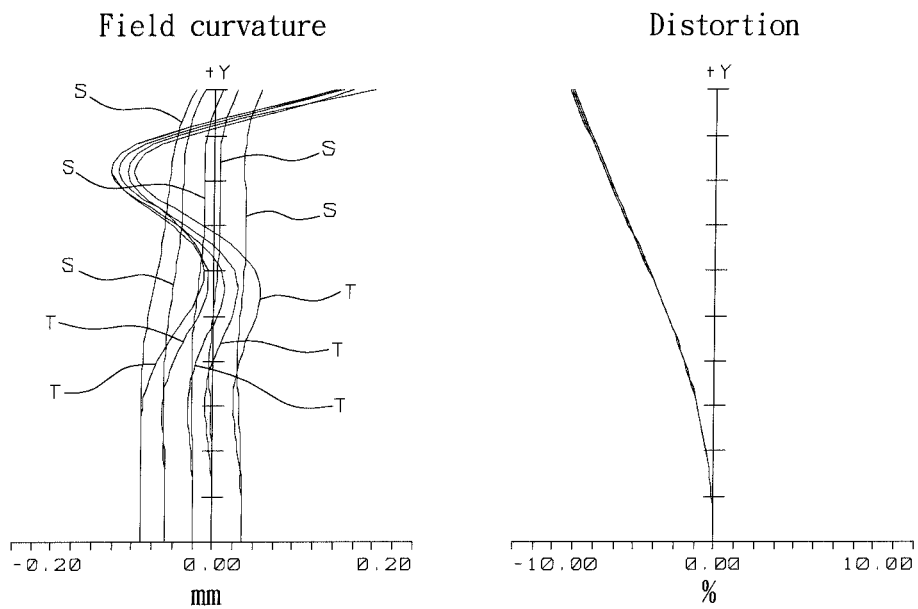
FIG. 4A is a field curvature diagram and a distortion diagram of the preferred embodiment of the present invention in the wide-angle mode.
Figure 4B:
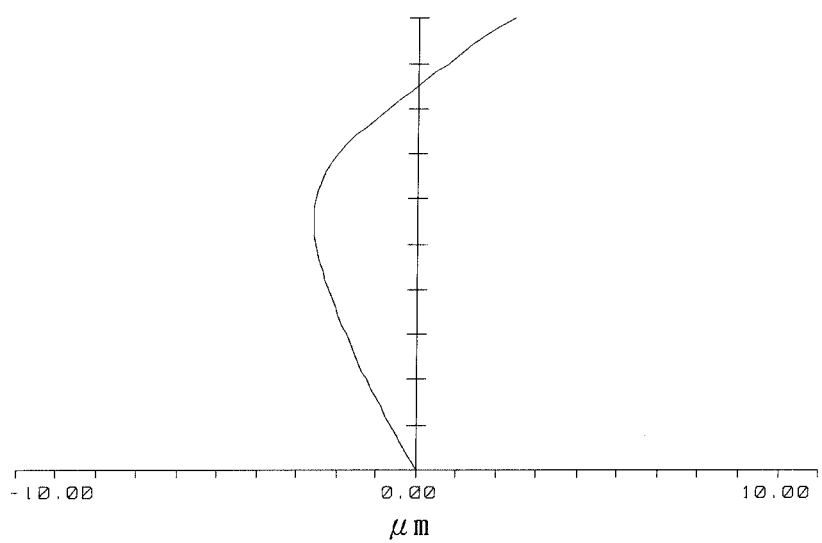
FIG. 4B is a transverse chromatic aberration diagram of the preferred embodiment of the present invention in the wide-angle mode.
Figure 4C:
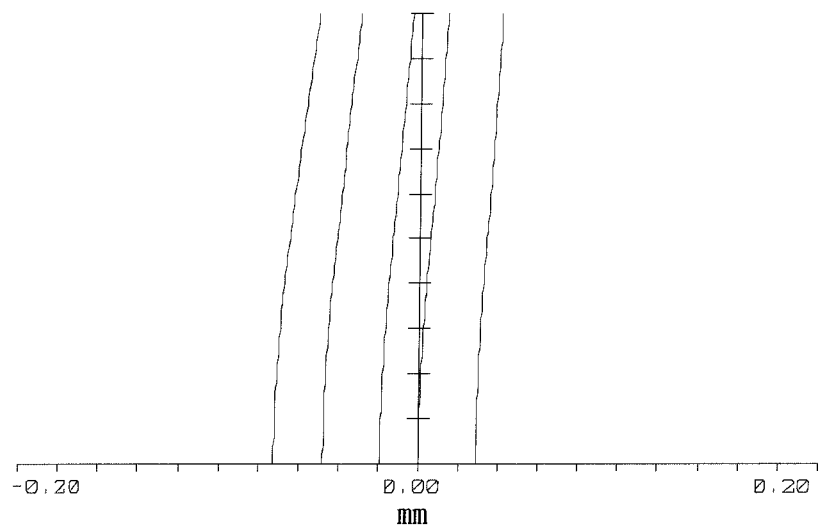
FIG. 4C is a spherical aberration diagram of the preferred embodiment of the present invention in the wide-angle mode.
Figure 4D:
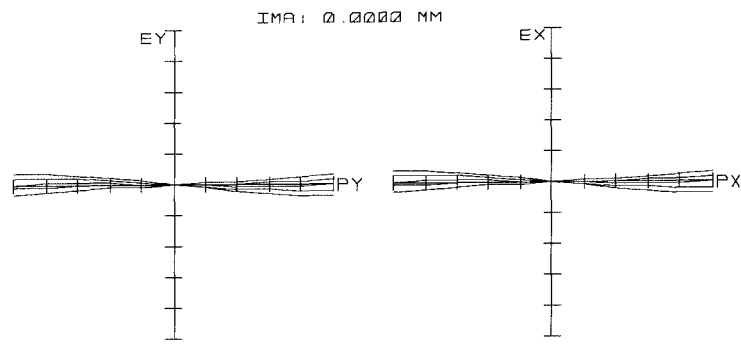
FIG. 4D is a coma aberration diagram of the preferred embodiment of the present invention in the wide-angle mode.
Figure 4D:
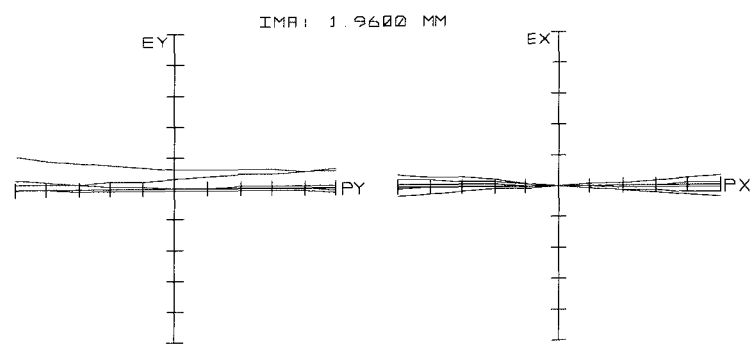
Figure 4D:
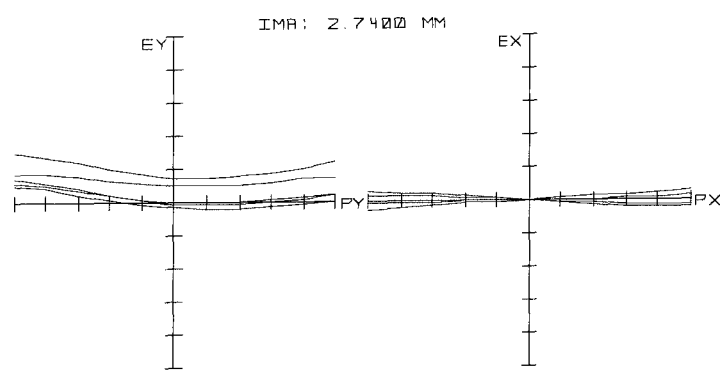

The arrangement of lenses and the apertures ST as described above may reduce the size of the zoom lens. The zoom lens still has a good optical performance in the wide-angle mode as shown in FIG. 4A to FIG. 4D. In FIG. 4A, it shows that the maximum field curvature is about 0.18 mm and −0.10 mm, and the maximum distortion is about −7%. In FIG. 4B, it shows that the maximum transverse chromatic aberration is about 3 μm. FIG. 4C shows that the maximum spherical aberration is about 0.06 mm and −0.08 mm. FIG. 4D shows that all the coma aberrations are acceptable.

Figure 5A:
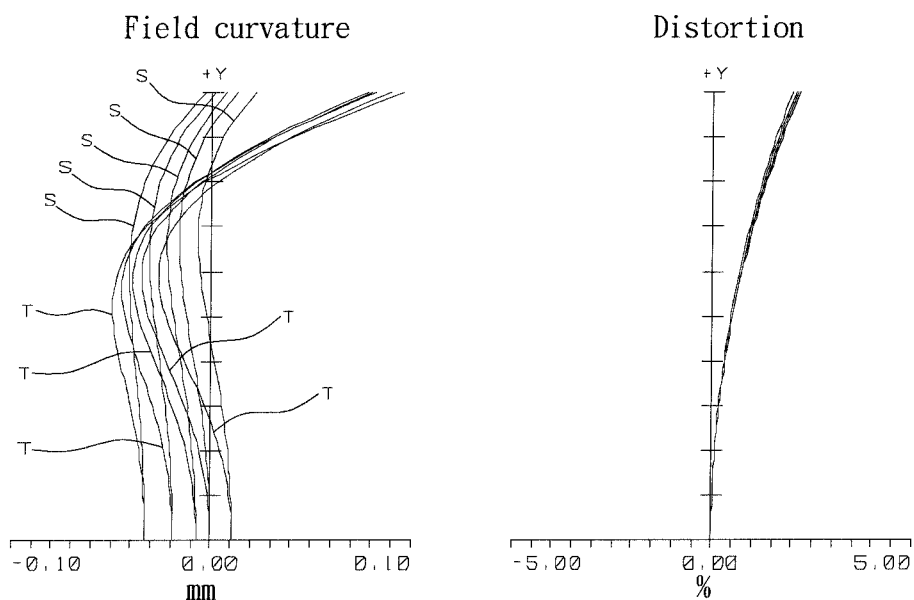
FIG. 5A is a field curvature diagram and a distortion diagram of the preferred embodiment of the present invention in the middle mode.
Figure 5B:
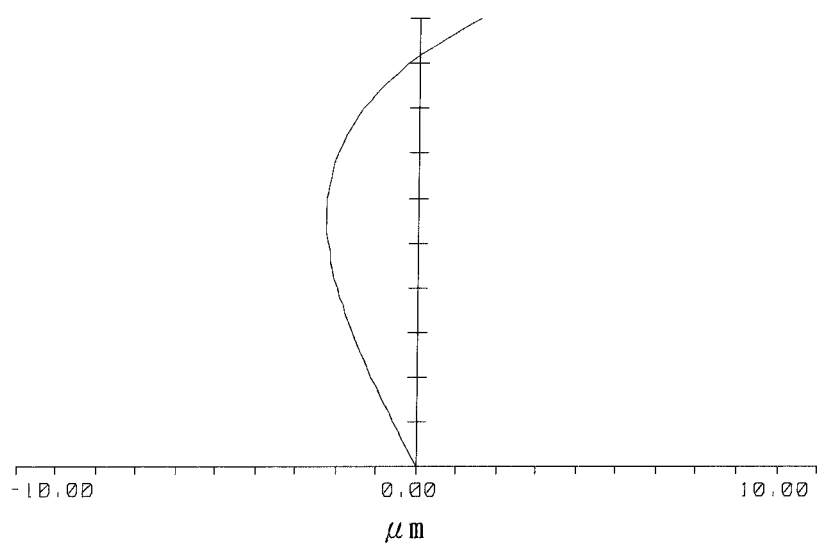
FIG. 5B is a transverse chromatic aberration diagram of the preferred embodiment of the present invention in the middle mode.
Figure 5C:
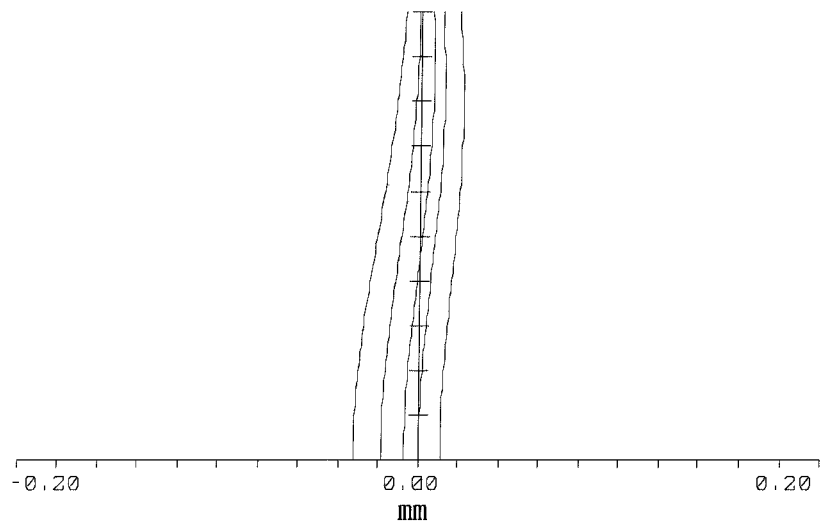
FIG. 5C is a spherical aberration diagram of the preferred embodiment of the present invention in the middle mode.
Figure 5D:
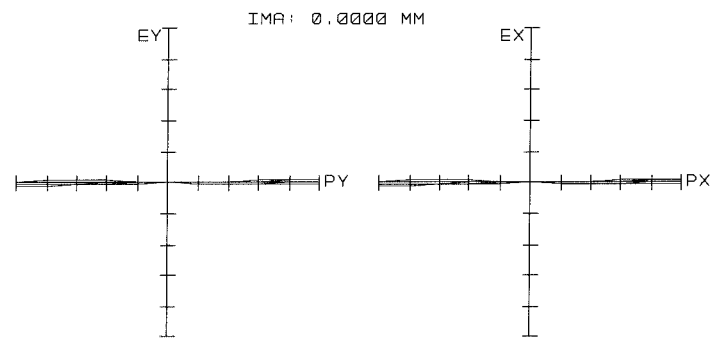
FIG. 5D is a coma aberration diagram of the preferred embodiment of the present invention in the middle mode.
Figure 5D:
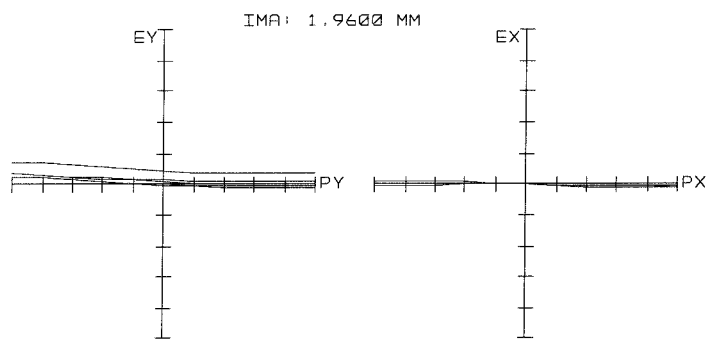
Figure 5D:
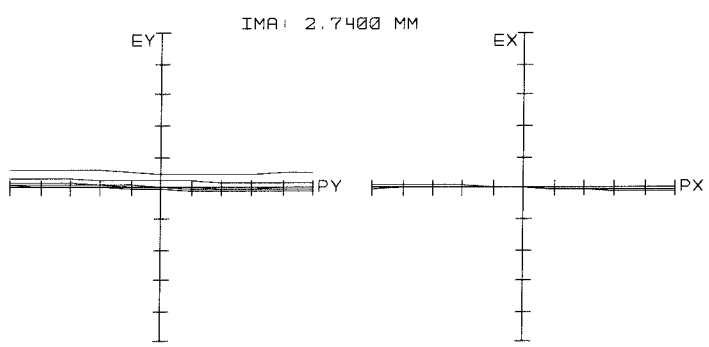

In the middle mode, the zoom lens has a good optical performance also. FIG. 5A shows the maximum field curvature is about 0.10 mm and −0.05 mm, and the maximum distortion is about 2.5%. In FIG. 5B, it shows that the maximum transverse chromatic aberration is about 2 μm and −3 μm. FIG. 5C shows that the maximum spherical aberration is about 0.04 mm and −0.04 mm. FIG. 5D shows that all the coma aberrations are acceptable.

Figure 6A:
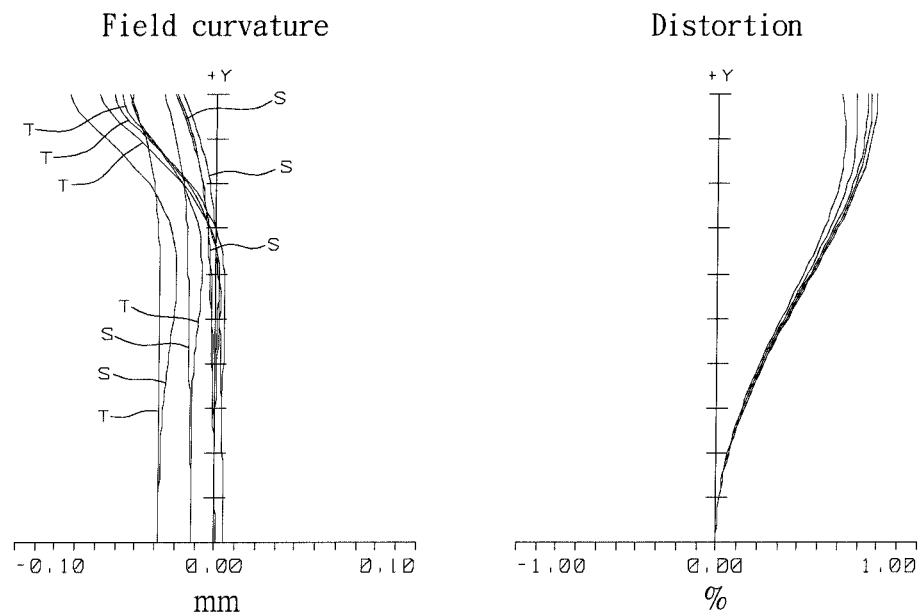
FIG. 6A is a field curvature diagram and a distortion diagram of the preferred embodiment of the present invention in the telephoto mode.
Figure 6B:
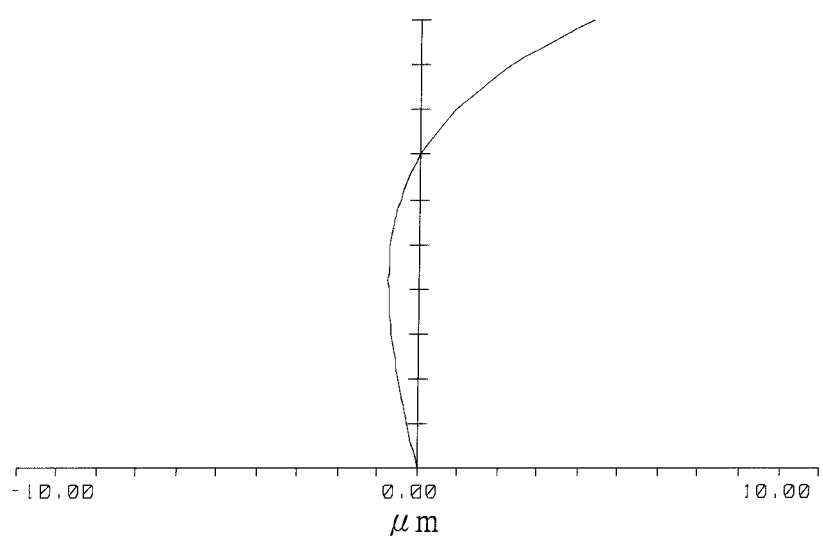
FIG. 6B is a transverse chromatic aberration diagram of the preferred embodiment of the present invention in the telephoto mode.
Figure 6C:
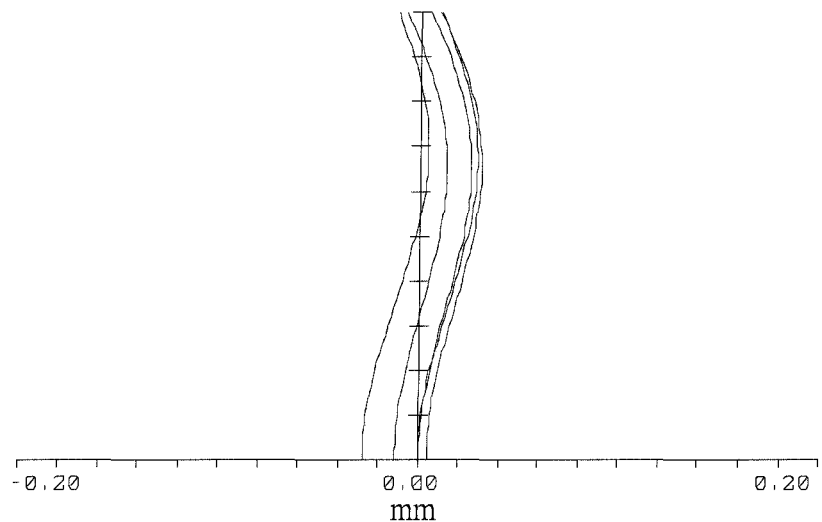
FIG. 6C is a spherical aberration diagram of the preferred embodiment of the present invention in the telephoto mode.
Figure 6D:
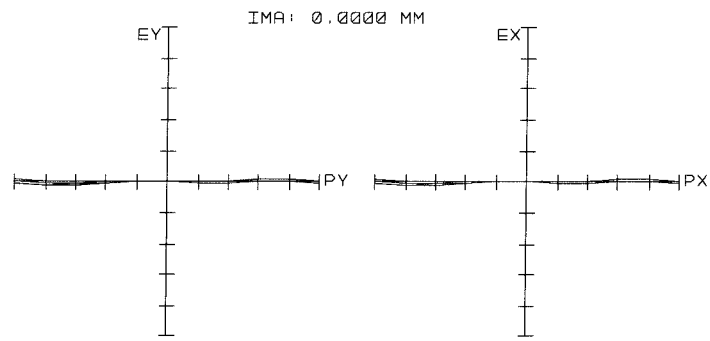
FIG. 6D is a coma aberration diagram of the preferred embodiment of the present invention in the telephoto mode.
Figure 6D:
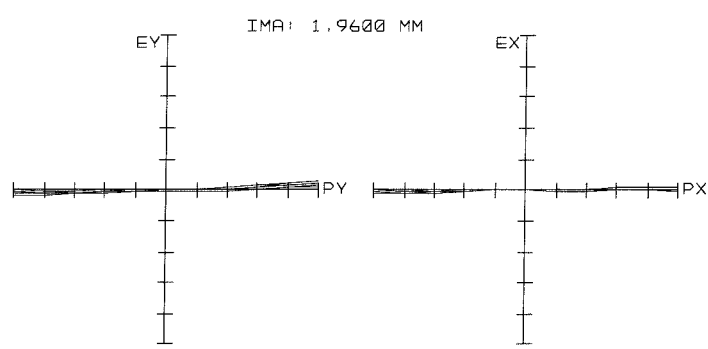
Figure 6D:
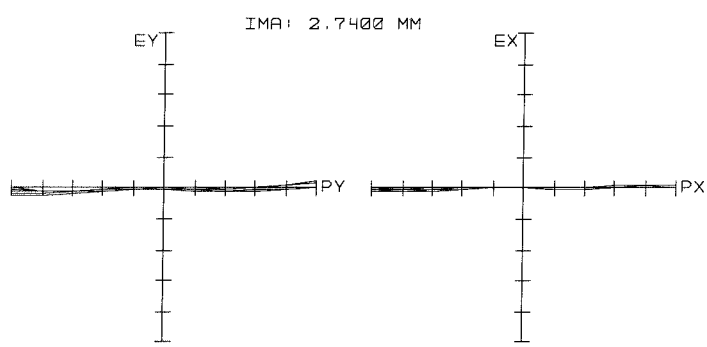

In the telephoto mode, FIG. 6A shows the maximum field curvature is about 0.01 mm and −0.08 mm, and the maximum distortion is about 0.8%. In FIG. 6B, it shows that the maximum transverse chromatic aberration is about 5 μm and −1 μm. FIG. 6C shows that the maximum spherical aberration is about 0.04 mm and −0.04 mm. FIG. 6D shows that all the coma aberrations are acceptable.

In conclusion, the zoom lens of the present invention has both the features of small size and high optical performance.

The description above is a few preferred embodiments of the present invention and the equivalence of the present invention is still in the scope of claim construction of the present invention.

What is claimed is:

1. A zoom lens, in order along an optical axis from an object side to an image side, comprising:
   a first lens group having positive refractive power, and including a first lens, a second lens, a third lens, and a fourth lens, wherein the first lens is a meniscus lens with negative refractive power, and a convex surface thereof faces the object side; the second lens is a flat lens; the third lens is a biconvex lens with positive refractive power, and has at least an aspheric surface; and the fourth lens is a biconvex lens with positive refractive power;

a second lens group having negative refractive power, and including a fifth lens, a sixth lens, and a seventh lens, wherein the fifth lens is a biconcave lens with negative refractive power, and has at least an aspheric surfaces; the sixth lens is a biconcave lens with negative refractive power; the seventh lens is a meniscus lens with positive refractive power, and a convex surface thereof faces the object side; and the sixth lens and seventh lens are coupled together to form a compound lens;

a third lens group having positive refractive power, and including an eighth lens, wherein the eighth lens is a meniscus lens with positive refractive power, and a convex surface thereof faces the object side; and the eighth lens has at least an aspheric surface;

an aperture;

a fourth lens group having positive refractive power, and including a ninth lens, a tenth lens, an eleventh lens, a twelfth lens, and a thirteenth lens, wherein the ninth lens is a biconvex lens with positive refractive power, and has an aspheric surface; the tenth lens is a meniscus lens with positive refractive power, and a convex surface thereof faces the object side; the eleventh lens is a meniscus lens with negative refractive power, and a convex surface thereof faces the object side;

the tenth lens and eleventh lens are coupled together to form a compound lens with positive refractive power; the twelfth lens is a biconvex lens with positive refractive power; the thirteenth lens is a biconcave lens with negative refractive power; and the twelfth lens and the thirteenth lens are coupled together to form a compound lens with positive refractive power; and a fifth lens group having positive refractive power, and including a fourteenth lens, wherein the fourteenth lens is a biconvex lens with positive refractive power, and has at least an aspheric surface;

wherein the zoom lens is switched to a telephoto mode from a wide-angle mode by moving the second lens group and the fourth lens group toward the third lens group.

2. The zoom lens as defined in claim 1, wherein both surfaces of the third lens of the first lens group are aspheric surfaces.

3. The zoom lens as defined in claim 1, wherein both surfaces of the fifth lens of the second lens group are aspheric surfaces.

4. The zoom lens as defined in claim 1, wherein a surface of the eighth lens of the third lens group which faces the object side is an aspheric surface.

5. The zoom lens as defined in claim 1, wherein a surface of the ninth lens of the fourth lens group which faces the object side is an aspheric surface.

6. The zoom lens as defined in claim 1, wherein both surfaces of the fourteenth lens of the fifth lens group are aspheric surfaces.

7. The zoom lens as defined in claim 1, further comprising a cover glass between the fifth lens group and the image side.

8. The zoom lens as defined in claim 1, wherein the zoom lens satisfies a feature of $8 \leq L/Z \leq 9.5$, where L is a total length of the zoom lens and Z is a zoom ratio of the zoom lens.

9. The zoom lens as defined in claim 1, wherein the zoom lens satisfies a feature of $3 \leq F1/D \leq 4$, where F1 is a focus length of the first lens group and D is a maximum imaging diameter of the zoom lens.

10. The zoom lens as defined in claim 1, wherein the zoom lens satisfies a feature of $Vd1n \geq 40$, where $Vd1n$ is an average of Abbe numbers of the lenses with negative refractive power in the first lens group.

11. The zoom lens as defined in claim 1, wherein the zoom lens satisfies a feature of $Vd1p \geq 75$, where $Vd1p$ is an average of Abbe numbers of the lenses with positive refractive power in the first lens group.

12. The zoom lens as defined in claim 1, wherein the eighth lens of the third lens group is a plastic lens.

13. The zoom lens as defined in claim 1, wherein the fourteenth lens of the fifth lens group is a plastic lens.

* * * * *